United States Patent [19]

Ebert et al.

[11] Patent Number: 4,943,623

[45] Date of Patent: Jul. 24, 1990

[54] PROCESS FOR THE PRODUCTION OF POLYESTERS AND THEIR USE AS BINDER OR BINDER COMPONENT IN POWDER LACQUERS

[75] Inventors: Wolfgang Ebert; Rolf-Volker Meyer; Hans-Joachim Kreuder, all of Krefeld, Fed. Rep. of Germany

[73] Assignee: Bayer Aktiengesellschaft, Leverkusen-Bayerwerk, Fed. Rep. of Germany

[21] Appl. No.: 273,949

[22] Filed: Nov. 21, 1988

[30] Foreign Application Priority Data

Dec. 3, 1987 [DE] Fed. Rep. of Germany ....... 3740932

[51] Int. Cl.$^5$ ................................................ C08G 63/02
[52] U.S. Cl. ..................................... 528/272; 528/274; 528/300; 528/302; 528/308; 528/308.6; 524/714; 524/717; 524/726; 428/423.7; 428/480
[58] Field of Search ............... 528/272, 274, 300, 302, 528/308, 308.6; 524/714, 717, 726; 428/423.7, 480

[56] References Cited

U.S. PATENT DOCUMENTS 4,004,063 1/1977 Peterson et al. ...................... 428/383
4,513,113 4/1985 Peterson ............................. 524/602

FOREIGN PATENT DOCUMENTS 0073492 9/1983 European Pat. Off. .

Primary Examiner—John Kight, III
Assistant Examiner—Sam A. Acquah
Attorney, Agent, or Firm—Connolly and Hutz

[57] ABSTRACT

Polyesters useful as a binder or a component of a binder for powder lacquers and which contain hydroxyls, carboxyls or both and which have an acid value of up to 50, a hydroxyl value of up to 200 and a sum of hydroxyl value and acid value of from 20 to 200 is produced by reacting:

(a) an acid component selected from the group consisting of (a1) at least one poly-functional organic carboxylic acid, (a2) at least one ester-forming derivative of a poly-functional organic carboxylic acid, (a3) at least one organic hydroxycarboxylic acid, (a4) at least one lactone of an organic hydroxycarboxylic acid, and mixtures thereof, with the proviso that at least 50 mol-% of component (a) consists of aromatic species of components (a1), (a2), (a3), (a4), or mixtures thereof, with (b) a polyol component which is at least one polyhydric alcohol having a molecular weight in the range from 62 to 250, while maintaining an equivalent ratio of carboxyl groups to hydroxyl groups of form 0.65:1 to 1.5:1, with the proviso that component (b) is used in a quantity of at least 30% by weight, based on the weight of component (a), and the reaction is carried out in the presence of (c) at least 5% by weight, based on the weight of components (a) and (b), of a solvent containing amide groups, lactam groups, or both and said solvent is free from any nitrogenhydrogen bonds.

7 Claims, No Drawings

PROCESS FOR THE PRODUCTION OF POLYESTERS AND THEIR USE AS BINDER OR BINDER COMPONENT IN POWDER LACQUERS

This invention relates to a new process for the production of polyesters containing carboxyl and/or hydroxyl groups suitable as binder or as binder component in powder lacquers and to the use of the polyesters thus obtained as binder or as binder component in powder lacquers.

BACKGROUND OF THE INVENTION

Polyesters containing hydroxyl and/or carboxyl groups are known and may be produced by various methods. Thus, polyesters can be obtained, for example, by self-catalysis from dicarboxylic acids and diols. However, this process is highly laborious in the case of aromatic dicarboxylic acids of the type preferably used for the production of polyesters for powder lacquers, so that reaction times of longer than 50 h before a defined, low terminal group concentration is adjusted are by no means rare.

Free acids cannot be used as catalysts in cases such as these, because the acid interferes with the use of the end product as a binder; on the other hand, separation is not possible during working up. Instead, the methyl ester rather than the free acid and a transesterification catalyst are normally used and methanol is distilled off from the reaction mixture. However, the catalysts used for the transesterification often have to be inactivated during the reaction and replaced by condensation catalysts because otherwise the molecular weight built up is inadequate. The catalysts used for this purpose are generally soluble compounds of Zn, Cd, Mn, Ti, Sn and Sb.

Apart from the inadequate acceleration of the reaction, disadvantages of this process include the discoloration which often occurs and the fact that the catalyst can no longer be removed from the reaction product.

BRIEF DESCRIPTION OF THE INVENTION

One object of the present invention is to provide a new process for the production of polyesters suitable as binder or as binder component for powder lacquers which provides for shorter reaction time and, hence, for more efficient production of the polyesters. This object can be surprisingly achieved by reacting an organic carboxylic acid component with a polyol component in the presence of amide-group-containing solvents free from N-H-bonds as the reaction medium.

DETAILED DESCRIPTION

The present invention relates to a process for the production of polyesters containing hydroxyl and/or carboxyl groups and having an acid value of up to 50 and a hydroxyl value of up to 200, the sum of the hydroxyl value and acid value being from 20 to 200, by reaction of (a) an acid component consisting of (a1) at least one polybasic organic carboxylic acid and/or (a2) at least one ester-forming derivative of a polybasic organic carboxylic acid and/or (a3) at least one organic hydroxycarboxylic acid and/or (a4) at least one lactone of an organic hydroxycarboxylic acid, with the proviso that at least 50 mol-% of component (a) consists of aromatic individual components (a1), (a2), (a3) and/or (a4). with b) a polyol component consisting of at least one polyhydric alcohol having a molecular weight in the range from 62 to 250, optionally using auxiliaries and additives and maintaining an equivalent ratio of carboxyl groups, including any potential carboxyl groups present in component (a), to hydroxyl groups, including any potential hydroxyl groups present in component (b) and the additives, of from 0.65:1 to 1.15:1, with the proviso that component (b) is used in a quantity of at least 30% by weight, based on the weight of component (a), characterized in that the reaction is carried out in the presence of (c) at least 5% by weight, based on the weight of components (a) and (b), of a solvent which contains amide and/or lactam groups and which is free from N-H-bonds.

The present invention also relates to the use of the polyesters obtained by this process as binder or as binder component in powder lacquers.

The acid component (a) to be used in accordance with the invention is at least one compound selected from the group consisting of compounds (a1), (a2), (a3) and (a4), although at least 50 mol-% of component (a) must consist of aromatic compounds (a1), (a2), (a3) or (a4).

Suitable compounds (a1) are any polybasic carboxylic acids which, apart from the carboxyl groups, are inert with respect to the esterification reaction. These polybasic carboxylic acids have a molecular weight of generally 118 to 564 and preferably 118 to 166. Suitable polybasic carboxylic acids such as these are, for example, terephthalic acid, isophthalic acid, phthalic acid, 1,2-naphthalene dicarboxylic acid, 1,4-naphthalene dicarboxylic acid, 1,5-naphthalene dicarboxylic acid, 1,8-naphthalehe dicarboxylic acid, 5-methylisophthalic acid, tetrahydrophthalic acid, 1,2-, 1,3-, -1,4-cyclohexanedicarboxylic acid, succinic acid, dimethyl malonic acid, glutaric acid, methyl succinic acid, adipic acid, dimethyl succinic acid, pimelic acid, suberic acid, hexahydroendomethylenetetrahydrophthalic acid, azelaic acid, sebacic acid, decanedicarboxylic acid, dimer fatty acid or 1,2-hydroxystearic acid. Mixtures of these acids may also be used. Preferred polybasic carboxylic acids (a1) are terephthalic acid, isophthalic acid, phthalic acid, tetrahydrophthalic acid, hexahydrophthalic acid, succinic acid, adipic acid or mixtures thereof.

The ester-forming carboxylic acid derivatives (a2) include, in particular, lower alkyl esters of polybasic acids of the type mentioned by way of example under (a1) or intramolecular acid anhydrides thereof. Examples include phthalic anhydride, tetrahydrophthalic anhydride, hexahydrophthalic anhydride, succinic anhydride, trimellitic anhydride or terephthalic acid dimethyl ester.

The synthesis components (a3) include hydroxycarboxylic acids having a molecular weight in the range from 76 to 300 and preferably in the range from 90 to 138, such as for example hydroxyacetic acid, 4-hydroxybutyric acid, hydroxypivalic acid, 12-hydroxystearic acid or p-hydroxybenzoic acid.

The synthesis components (a4) include lactones of hydroxy carboxylic acids of the type mentioned by way of example under (a3), such as for example ε-caprolactone or butyrolactone.

At least 50% by weight of component (a) preferably consists of terephthalic acid or an ester-forming derivative thereof, particularly terephthalic acid dimethyl ester.

Component (b) may be a polyhydric alcohol having a molecular weight in the range from 62 to 250, such as for example ethylene glycol, propane-1,2-diol, propane-1,3-diol, 2,2-dimethylpropane-1,3-diol, butane-1,2-diol, butane-1,3diol, butane-2,3-diol, butane-1,4-diol, pentane-1,5-diol, hexane-1,6-diol, 2,2-dimethyl-4,4-dimethylcyclobutanediol, 1,2-cyclopentanediol, 1,3-cyclopentanediol, 1,2-cyclohexanediol, 1,3-cyclohexanediol, 1,4-cyclohexanediol, 1,4dimethylolcyclohexane, hexane-2,5-diol, 2,2-bis-(4-hydroxy-cyclohexyl)-propane, diethylene glycol, triethylene glycol, dipropylene glycol, 2,2,4-trimethylpentane-1,3-diol, 2-methylpentane-2,4-diol, 2-ethylhexane-1,3-diol, glycerol, hexanetriols, pentaerythritol, sorbitol, trimethylolethane, trimethylolpropane, or a mixture of these polyhydric alcohols.

Where a certain degree of branching is desired in the end products of the process according to the invention, it may be achieved by the co-use of more than difunctional starting components (a) and/or (b) or even of polyepoxide compounds, such as for example, the diglycidyl ether of bisphenol A, as an additive.

For the rest, in the practical application of the process according to the invention, the type of and quantitative ratios between components (a) and (b) are selected so that the resulting polyesters have an acid value of from 2 to 50 and a hydroxyl value of from 5 to 200, the sum of the acid value and the hydroxyl value being from 20 to 200. The type of and quantitative ratios between the starting materials are preferably selected so that an acid value of from 0 to 50 and a hydroxyl value of at most 20 or a hydroxyl value of from 0 to 50 and an acid value of at most 20 are obtained, the sum of the hydroxyl value and the acid value always being within the limits mentioned above. In addition, the quantitative ratios between the starting components (a) and (b) correspond to an equivalent ratio of carboxyl groups, including any potential carboxyl groups present, to hydroxyl groups, including any potential hydroxyl groups present, of from 0.65:1 to 1.15:1, although component (b) is always used in a quantity of at least 30% by weight, based on the weight of component (a).

"Potential carboxyl groups" in the above context are, in particular, acid anhydride groups (one anhydride group=two potential carboxyl groups), ester groups (one methyl ester group=one potential carboxyl group) and lactone groups (one lactone group=one potential carboxyl group). "Potential hydroxyl groups" are, in particular, lactone groups (one lactone group=one potential hydroxyl group). In the event of the abovementioned, but less preferred co-use of polyepoxides as crosslinking additives, the epoxide groups would also have to be regarded as potential hydroxyl groups (1 epoxide group=2 potential hydroxyl groups) and included in the calculation of the equivalent ratio of carboxyl to hydroxyl groups.

Now, the important point of the invention is that the esterification reaction is carried out in the presence of solvents which contain amide groups and/or lactam groups, but no N-H-bonds. In the practical application of the process according to the invention, these solvents are used in a quantity of at least 5% by weight, generally in a quantity of 5 to 900% by weight and preferably in a quantity of 10 to 300% by weight, based in each case on the weight of components (a) and (b).

Suitable solvents are any N-substituted lactams having a molecular weight in the range from 85 to 449 and preferably in the range from 85 to 169 and any N,N-disubstituted carboxylic acid amides having a molecular weight in the range from 87 to 311 and preferably in the range from 87 to 205, which are inert to the reactants and which are liquid under the reaction conditions, i.e. represent a solvent for the reactants.

Typical examples of solvents such as these are N-methyl-2-pyrrolidone, N-ethyl-2-pyrrolidone, N-n-propyl-2-pyrrolidone, N-i-propyl-2-pyrrolidone, N-butyl-2-pyrrolidone, N-i-butyl-2-pyrrolidone, N-cyclopentyl-2-pyrrolidone, N-cyclohexyl-2-pyrrolidone, N-benzyl-2-pyrrolidone, N-stearyl-2-pyrrolidone, N-methylcaprolactam, N-ethylcaprolactam, N-n-propylcaprolactam, N-i-butylcaprolactam, N-stearylcaprolactam, N-cyclopentylcaprolactam, N-cyclohexylcaprolactam, N-benzylcaprolactam, N-methyllauriclactam, N-ethyllauriclactam, N-n-propylauriclactam, N-i-propyllauriclactam, N-n-butyllauriclactam, N-i-butyllauriclactam, N-stearyllauriclactam, N-cyclopentyllauriclactam, N-cyclohexyllauriclactam, N-benzyllauriclactam, N-methyl-2-piperidone, N-ethyl-2-piperidone N-isopropyl-2-piperidone, N-n-butyl-2-piperidone, N-i-butyl-2-piperidone, N,N-dimethylacetamide, N,N-diethylacetamide, N,N-dipropylacetamide, N,N-dimethylbenzoic acid amide, N,N-diethylbenzoic acid amide, N,N-di-n-propylbenzoic acid amide, N,N-di-i-propylbenzoic acid amdie, N,N-dimethylstearic acid amide.

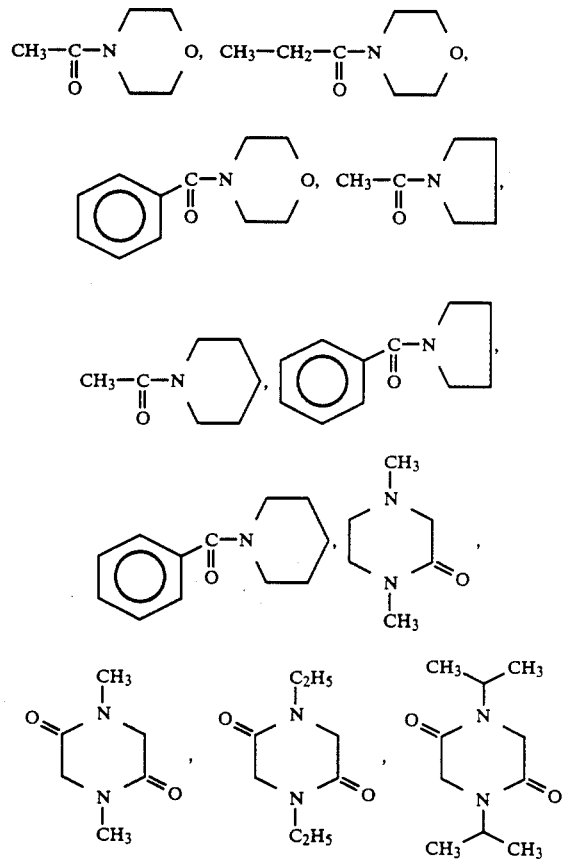

Preferred solvents are 2-methyl-2-pyrrolidone, N-ethyl-2pyrrolidone, N-i-propyl-2-N-cyclopentyl-2-pyrrolidone, N-cyclohexyl-2-pyrrolidone, N-methylcaprolactam, N-ethylcaprolactam, N-i-propylcaprolactam, N-butylcaprolactam, N-cycloihexylcaprolactam, N-stearylcaprolactam, N-methyllauriclactam, N- metylpiperidone, N-ethylpiperidine, N-butylpiperidone, N,N-dimethylbenzoic N,N-dimethylbenzoic acid amide, N,N-diethylbenzoic acid amide, N,N-diisopropylbenzoic acid amide,

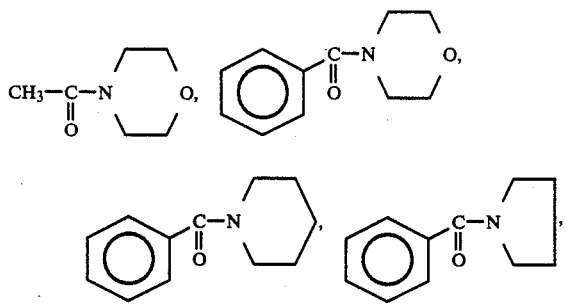

Particularly preferred solvents for the purposes of the invention are N-cyclohexyl-2-pyrrolidone, N-methylcaprolactam, N-ethylcaprolactam, N-i-propylcaprolactam, N-butylcaprolactam, N,N-dimethylbenzoic acid amide, N,N-diethylbenzoic acid amide, N,N-diisopropylbenzoic acid amide.

Although it is one of the advantages of the process according to the invention that greatly increased reaction velocities are achieved even in the absence of catalysts, this does not rule out the co-use of esterification catalysts known per se. The co-use of catalysts will be considered in particular when catalytic acceleration of the crosslinking reaction is desired in the subsequent application of the end products of the process. Accordingly, the catalysts would be used less to accelerate the reaction taking place during the process according to the invention and more in view of the subsequently catalytically accelerated crosslinking reaction. These catalysts may of course also be incorporated in the end products of the process after their production. Suitable catalysts are, in particular, catalysts based on heavy metals, such as for example titanium, tin or antimony, such as for example titanic acid tetraalkyl ester containing $C_3$–$C_{10}$ alkyl radicals, such as for example tetraisopropyl titanate, tetrabutyl titanate, tetraoctyl titanate, tetra-decyl titanate, organotin compounds, such as dibutyltin oxide, butylhydroxytin oxide, dodecyltin oxide, and antimony oxides.

The process according to the invention, i.e. the polycondensation reaction, is generally carried out at a temperature in the range from 120° to 280° C. and preferably at a temperature in the range from 140° to 270° C., with removal of the water of condensation formed by distillation, although it is important to ensure that the stoichiometry is not disturbed by "carryover" of organic starting materials. After the elimination of water has stopped, the reaction mixture is generally heated briefly to the reflux temperature and the solvent subsequently removed by distillation, optionally in vacuo. Other possible methods of working up comprise, for example, precipitation of the reaction mixture, for example in water, or working up of the reaction mixture in extruders with degassing zones.

The end products of the process according to the invention generally have a melting point or melting range of 45° to 80° C. and preferably 50° to 70° C. This property of the end products of the process according to the invention may be determined in simple preliminary tests by suitably choosing the type of and quantitative ratios between the starting materials (a) and (b) mentioned by way of example.

The end products of the process according to the invention are suitable in combination with standard hardeners for the production of high-quality powder lacquers.

Suitable hardeners for hydroxyl polyesters are, for example, blocked polyisocyanates, such as the partial trimer of 1-isocyanato-3,3,5-trimethyl-5-isocyanatomethylcyclohexane (IPDI) in ε-caprolactam-blocked form, or IPDI urethanized by reaction with substoichiometric quantities of polyhydric alcohols in c-caprolactam-blocked form or ε-caprolactam-blocked adducts of IPDI with glycols, such as ethylene glycol or diethylene glycol. Suitable hardeners for polyesters containing carboxyl groups are, in particular, polyepoxides. Thus, N,N',N''-triglycidylisocyanurate is used, for example, for weather-resistant coatings while the diglycidyl ether of bisphenol A is used for non-weather-resistant coatings. In addition, irreversibly blocked polyuretdiones based on IPDI are also suitable hardeners for polyesters containing hydroxyl groups.

The usual auxiliaries and additives, such as for example pigments, levelling aids, catalysts and the like, may be incorporated in the powder lacquers. The powder lacquers are suitable for the coating of any heat-resistant substrates, particularly metals, by fluidized bed coating or by electrostatic powder spraying.

The following Examples are intended to illustrate the invention without limiting it in any way.

COMPARISON EXAMPLE 1

433.30 g (4.166 mol) 2,2-dimethylpropane-1,3-diol, 600.2 g (3.616 mol) terephthalic acid, 95.1 g (0.573 g) isophthalic acid and 28.2 g (0.1468 mol) trimellitic anhydride are introduced into and heated to 190° C. in a 2-liter round-bottomed flask equipped with a stirrer, thermometer, nitrogen connection, short column and distillation bridge. The temperature is then controlled in such a way that water is distilled off slowly, but steadily. After 56 h, the mixture in the sump is clear. The mixture is then stirred for 2 h at 265° C. The polyester obtained has a hydroxyl value (OHV) of 2.5 and an acid value (AV) of 35.

EXAMPLE 1

If 500 ml N-methylcaprolactam are added to the reaction mixture of the Comparison Example, the mixture becomes clear after 8 h for a sump temperature of 191° to 222° C. The mixture is stirred for 1 hour at 222° C. and the N-methylcaprolactam subsequently distilled off under reduced pressure (water jet vacuum). After post-condensation for 2 h at 240° to 270° C., a polyester having the following characteristic values is obtained: OHV=2, AV=38.

EXAMPLE 2

The procedure is as in Example 1, except that only 250 ml N-methylcaprolactam are used. A clear polyester mixture is present after 19 h, being stirred, distilled and post-condensed in the same way as in Example 2: OHV=2.5, AV=35.

EXAMPLE 3

433.3 g (4.166 mol) 2,2-dimethylpropane-1,3-diol, 695.4 g (4.189 mol) terephthalic acid and 28.2 g (0.147 mol) trimellitic anhydride are heated to 200° C. in 500 ml N-methylcaprolactam in such a way that water, but no solvent, distills off. The mixture is clear after 14 h, by which time the temperature has risen to 231° C. The mixture is then stirred for 1 h at 231° C. The N-methylcaprolactam is removed under reduced pressure and post-condensed for 2.5 h at 246° C. OHV=4.5, AV=35.

EXAMPLE 4

686 4 g (4.135 mol) terephthalic acid, 102.7 g (0.618 mol) isophthalic acid, 222.9 g (2.143 mol) 2,2-dimethylpropane-1,3-diol, 132.9 g (2.144 mol) ethylene glycol, 22.9 g (0.2489 mol) glycerol are condensed in 500 ml N-methylcaprolactam at 225° C. The mixture is clear after 6.5 h and is stirred, distilled and post-condensed as described in Example 4. OHV=11, AV=38.

COMPARISON EXAMPLE 2

The procedure is as in Example 4 except that no N-methylcaprolactam is used. The mixture only turns clear after 42 h. OHV=10, AV=38.

EXAMPLE 5

39.7 g (0.296 mol) trimethylolpropane, 319.4 g (3.067 mol) 2,2-dimethylpropane-1,3-diol, 47 g (0.398 mol) hexane-1,6-diol, 593.9 g (3.575 mol) terephthalic acid are condensed in 500 ml N-methylcaprolactam. After 5 h, during which the temperature has risen from 196° C. to 228° C. in the sump, the mixture is clear. The mixture is then stirred for 2 h at 228° C., the N-methylcaprolactam is distilled off in vacuo and the residue post-condensed for 4 h at 240° C. OHV=40, AV=9.

COMPARISON EXAMPLE 3

The procedure is as in Example 5, except that no N-methylcaprolactam is used. After a reaction time of 42 h, a polyester is obtained which has a hydroxyl value of 50 and an acid value of 10.

APPLICATION EXAMPLES

General procedure for production of a powder lacquer:

The carboxyl polyesters used in Comparison Example 4 and in Example 6 (use according to the invention) are dry-mixed with the hardener mentioned in the following and with the additives mentioned in the following.

The resulting mixtures are then homogenized in the melt in a laboratory extruder at temperatures of 80° to 120° C. After cooling and before size reduction, the extrudates are ground in a fan mill to a powder lacquer having an average particle size of 50 μm. After the coarse particles (larger than 90 μm) present have been sifted off, the ready-to-use powder lacquers are sprayed by means of an electrostatic powder sprayer onto twice-pickled, degreased test plates (length 16.5 cm, width 65 mm, thickness 0.8 mm) at a negative voltage of approximately 60 kV. The plates are then baked at various temperatures.

The polyesters in Comparison Example 5 and Example 7 according to the invention) are first dry-mixed with the hardener mentioned below and with the additives mentioned below. The mixtures are then homogenized in the melt in a laboratory extruder at temperatures of 80° to 120° C. After cooling and preliminary size-reduction, the extrudates are ground in a fan mill to a powder lacquer having an average particle size of 50 μm. After the coarse particles present (larger than 90 μm) have been sifted off, the ready-to-use powder lacquers are sprayed by means of an electrostatic powder sprayer onto twice-pickled, degreased test plates (length 16.5 cm, width 65 mm, thickness 0.8 mm) at a negative voltage of approximately 60 kV. The plates are then baked at various temperatures.

Determination of the properties of the coatings obtained:

The properties of the coatings shown in the following Table were determined as follows: Gloss: Gardner gloss, DIN 67 530, angle 60°

Acetone resistance:

The lacquer surfaces were rubbed 50 times (double passes) with an acetone-impregnated cotton wool pad. "0" means that there was no visible change in the surface of the lacquer.

Bending test:

The 0.8 mm thick coated steel plates are bent. The lacquer films should neither crack nor peel. "0" means that the test was successfully passed.

Erichsen indentation:

Gradual deformation by ball indentation from the rear in mm according to DIN 53 156.

Whiteness: Determined by A. Berger's method.

Gel time:

Determined in accordance with DIN draft 55 990, Part 8.

COMPARISON EXAMPLE 4

Composition of the powder lacquer:

55 2 pbw polyester of Comparison Example 1

4.2 pbw Commercial polyepoxide hardener (® Araldit PT 810, a product of Ciba Geigy AG)

0.6 pbw commercial levelling agent (® Acronal 4 F, a product of BASF AG)

40 pbw titanium dioxide pigment (rutile).

EXAMPLE 6 (use according to the invention)

Composition of the powder lacquer:

As in Comparison Example 4, but using 55.2 parts by weight of the polyester of Example 1.

COMPARISON EXAMPLE 5

Composition of the powder lacquer:

44.5 pbw polyester of Comparison Example 3

14.9 pbw commercial polyisocyanate hardener based on an ε-caprolactam-blocked IPDI derivative (® Crelan UI: a product of Bayer AG)

0.6 pbw levelling agent (as in Comparison Example 4)

40 pbw pigment (as in Comparison Example 4)

EXAMPLE 7 (use according to the invention)

Composition of the powder lacquer:

As in Comparison Example 5, but using 44.5 pbw of the polyester of Example 5.

|  | Comparison Example 4 | Example 6 | Comparison Example 5 | Example 7 |
|---|---|---|---|---|
| Stoving temp. (°C.) | 200 | 200 | 200 | 200 |
| Stoving time (mins) | 10 | 10 | 10 | 10 |
| Data |  |  |  |  |

-continued

|  | Comparison Example 4 | Example 6 | Comparison Example 5 | Example 7 |
| --- | --- | --- | --- | --- |
| Layer thickness (μ) | 55 | 57 | 53 | 56 |
| Gloss | 88 | 92 | 84 | 87 |
| Acetone resistance | 0 | 0 | 0 | 0 |
| Bending test | 0 | 0 | 0 | 0 |
| Erichsen indentation (mm) | 9 | 9 | 9 | 9 |
| Whiteness (initial) | 84 | 89 | 80 | 83 |
| Whiteness after overbaking |  |  |  |  |
| 15 mins/200° C. | 80 | 85 | 72 | 76 |
| 20 mins/220° C. | 74 | 80 | 68 | 71 |
| Gel time (180° C.) in secs | 420 | 410 | 450 | 446 |

The whiteness results after overbaking show that the tendency towards yellowing is better in the case of the polyesters produced in solution in accordance with the invention.

What is claimed is:

1. In an improved powder lacquer containing a binder, the improvement which comprises said binder or a component of said binder being a polyester containing hydroxyls, carboxyls or both and having an acid value of up to 50 and a hydroxyl value of up to 200, wherein the sum of the hydroxyl value and the acid value is from 20 to 200, which polyester has been produced by reacting (a) an acid component which is at least 50% by weight of terephthalic acid with (b) a polyol component which is at least one polyhydric alcohol having a molecular weight in the range from 62 to 250, while maintaining an equivalent ratio of carboxyl groups to hydroxyl groups of from 0 65:1 to 1.5:1, with the proviso that component (b) is used in a quantity of at least 30% by weight, based on the weight of component (a), and the reaction is carried out in the presence of (c) at least 5% by weight, based on the weight of components (a) and (b), of a solvent containing amide groups, lactam groups, or both and said solvent is free from any nitrogen-hydrogen bonds.

2. The lacquer according to claim 1 wherein solvent (c) is an N-substituted lactam having a molecular weight from 85 to 449.

3. The lacquer according to claim 1 wherein solvent (c) is an N,N-disubstituted carboxylic acid amide having a molecular weight from 87 to 311.

4. The lacquer according to claim 1 wherein N-methylcaprolactam is the solvent (c).

5. The lacquer according to claim 1 wherein reactants (a) and (b) and the ratios thereof are such that the resulting polyester has an acid value of 0 to 50 and a hydroxyl value of at least 20.

6. The lacquer according to claim 'wherein reactants (a) and (b) and the ratios thereof are such that the resulting polyester has an acid value of at most 15 and a hydroxyl value of 0 to 50.

7. The lacquer according to claim 1 wherein the binder is produced by reacting (a) and (b) in the presence of catalysts or branching polyhydroxyl compounds.

* * * * *